United States Patent [19]
Yamada

[11] Patent Number: 5,764,387
[45] Date of Patent: Jun. 9, 1998

[54] COLOR CORRECTION DEVICE HAVING SEPARATE TABLES FOR BLACK AND COLOR IMAGE DATA

[75] Inventor: Yasumasa Yamada, Chiba, Japan

[73] Assignee: Seiko Instruments Information Devices Inc., Japan

[21] Appl. No.: 651,142

[22] Filed: May 22, 1996

[30] Foreign Application Priority Data

May 23, 1995 [JP] Japan ..................... 7-124043

[51] Int. Cl.$^6$ ..................... H04N 1/46; H04N 1/40
[52] U.S. Cl. .................... 350/525; 358/298; 358/518
[58] Field of Search ..................... 358/298, 296, 358/518, 519, 521–525, 530, 539; 382/162, 165–167

[56] References Cited

U.S. PATENT DOCUMENTS

| | | |
|---|---|---|
| 4,060,829 | 11/1977 | Sakamoto . |
| 4,275,413 | 6/1981 | Sakamoto et al. . |
| 4,992,861 | 2/1991 | D'Errico ..................... 358/525 |
| 5,442,718 | 8/1995 | Kobayashi et al. ............ 358/525 X |
| 5,475,510 | 12/1995 | Ikegami ..................... 358/525 |
| 5,479,272 | 12/1995 | Saito ........................... 358/518 |
| 5,666,437 | 9/1997 | Vandran, Jr. ................ 382/167 |

FOREIGN PATENT DOCUMENTS

| | | |
|---|---|---|
| 0410719 | 1/1991 | European Pat. Off. . |
| 0695080 | 1/1996 | European Pat. Off. . |
| 1369702 | 10/1974 | United Kingdom . |
| 2053619 | 2/1981 | United Kingdom . |

*Primary Examiner*—Eric Frahm
*Attorney, Agent, or Firm*—Adams & Wilks

[57] ABSTRACT

A color correction device which minimizes color differences throughout an area to be subjected to color reproduction includes a dynamic range conversion circuit for the colors cyan, magenta, and yellow, a separation circuit for separating the colors into high order bits and low order bits, and a CMY table reference for obtaining CMY table values corresponding to the high order bits. An interpolation circuit performs an interpolation process based on the low order bits and the CMY table values. A K-table reference obtains four K-table values corresponding to black, and a CMY correction circuit corrects for the values of cyan, magenta, and yellow based on three interpolated data from the interpolation circuit and three data obtained by the K-table reference.

5 Claims, 8 Drawing Sheets

F I G. 1
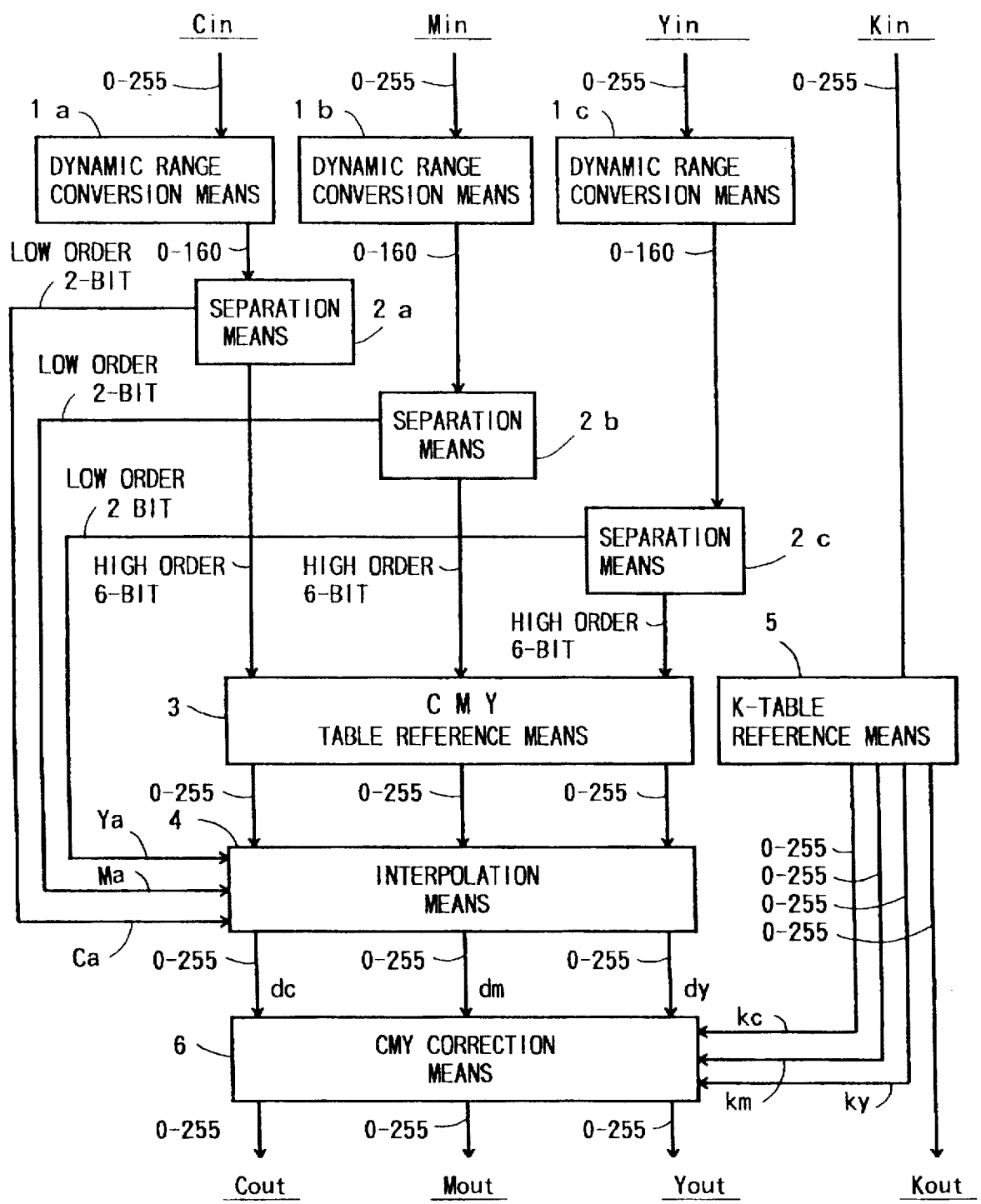

FIG. 5

| Ya | Mb | Ca | SYMBOL | CALCULATION EQUATION |
|---|---|---|---|---|
| 3 | 3 | 3 | a333 | (d000* 1 + d001* 3 + d010* 3 + d011* 9 + d100* 3 + d101* 9 + d110* 9 + d111*27) / 64 |
| 3 | 3 | 2 | a332 | (d000* 1 + d001* 1 + d010* 3 + d011* 3 + d100* 3 + d101* 3 + d110* 9 + d111* 9) / 32 |
| 3 | 3 | 1 | a331 | (d000* 3 + d001* 1 + d010* 9 + d011* 3 + d100* 9 + d101* 3 + d110*27 + d111* 9) / 64 |
| 3 | 3 | 0 | a330 | (d000* 1 + d010* 3 + d100* 3 + d110* 9) / 16 |
| 3 | 2 | 3 | a323 | (d000* 1 + d001* 3 + d010* 1 + d011* 3 + d100* 3 + d101* 9 + d110* 3 + d111* 9) / 32 |
| 3 | 2 | 2 | a322 | (d000* 1 + d001* 1 + d010* 1 + d011* 1 + d100* 3 + d101* 3 + d110* 3 + d111* 3) / 16 |
| 3 | 2 | 1 | a321 | (d000* 3 + d001* 1 + d010* 3 + d011* 1 + d100* 9 + d101* 3 + d110* 9 + d111* 3) / 32 |
| 3 | 2 | 0 | a320 | (d000* 1 + d010* 1 + d100* 3 + d110* 3) / 8 |
| 3 | 1 | 3 | a313 | (d000* 3 + d001* 9 + d010* 1 + d011* 3 + d100* 9 + d101*27 + d110* 3 + d111* 9) / 64 |
| 3 | 1 | 2 | a312 | (d000* 3 + d001* 3 + d010* 1 + d011* 1 + d100* 9 + d101* 9 + d110* 3 + d111* 3) / 32 |
| 3 | 1 | 1 | a311 | (d000* 9 + d001* 3 + d010* 3 + d011* 1 + d100*27 + d101* 9 + d110* 9 + d111* 3) / 64 |
| 3 | 1 | 0 | a310 | (d000* 3 + d010* 1 + d100* 9 + d110* 3) / 16 |
| 3 | 0 | 3 | a303 | (d000* 1 + d001* 3 + d100* 3 + d101* 9) / 16 |
| 3 | 0 | 2 | a302 | (d000* 1 + d001* 1 + d100* 3 + d101* 3) / 8 |
| 3 | 0 | 1 | a301 | (d000* 3 + d001* 1 + d100* 9 + d101* 3) / 16 |
| 3 | 0 | 0 | a300 | (d000* 1 + d100* 3) / 4 |

FIG. 6

| Ya | Ma | Ca | SYMBOL | CALCULATION EQUATION |
|---|---|---|---|---|
| 2 | 3 | 3 | a233 | (d000* 1 + d001* 3 + d010* 3 + d011* 9 + d100* 1 + d101* 3 + d110* 3 + d111* 9) / 32 |
| 2 | 3 | 2 | a232 | (d000* 1 + d001* 1 + d010* 3 + d011* 3 + d100* 1 + d101* 1 + d110* 3 + d111* 3) / 16 |
| 2 | 3 | 1 | a231 | (d000* 3 + d001* 1 + d010* 9 + d011* 3 + d100* 3 + d101* 1 + d110* 9 + d111* 3) / 32 |
| 2 | 3 | 0 | a230 | (d000* 1 + d001* 3 + d010* 1 + d100* 3) / 8 |
| 2 | 2 | 3 | a223 | (d000* 1 + d001* 3 + d010* 1 + d011* 3 + d100* 1 + d101* 3 + d110* 1 + d111* 3) / 16 |
| 2 | 2 | 2 | a222 | (d000* 1 + d001* 1 + d010* 1 + d011* 1 + d100* 1 + d101* 1 + d110* 1 + d111* 1) / 8 |
| 2 | 2 | 1 | a221 | (d000* 3 + d001* 1 + d010* 3 + d011* 1 + d100* 3 + d101* 1 + d110* 3 + d111* 1) / 16 |
| 2 | 2 | 0 | a220 | (d000* 1 + d001* 1 + d110* 1) / 4 |
| 2 | 1 | 3 | a213 | (d000* 3 + d001* 9 + d010* 3 + d011* 1 + d100* 3 + d101* 9 + d110* 1 + d111* 3) / 32 |
| 2 | 1 | 2 | a212 | (d000* 1 + d001* 3 + d010* 1 + d011* 1 + d100* 3 + d101* 3 + d110* 1 + d111* 1) / 16 |
| 2 | 1 | 1 | a211 | (d000* 9 + d001* 3 + d010* 3 + d011* 1 + d100* 9 + d101* 3 + d110* 3 + d111* 1) / 32 |
| 2 | 1 | 0 | a210 | (d000* 3 + d010* 1 + d100* 3 + d110* 1) / 8 |
| 2 | 0 | 3 | a203 | (d000* 1 + d001* 3 + d101* 1 + d111* 3) / 8 |
| 2 | 0 | 2 | a202 | (d000* 1 + d001* 1 + d101* 1 + d111* 1) / 4 |
| 2 | 0 | 1 | a201 | (d000* 3 + d001* 1 + d100* 3 + d101* 1) / 8 |
| 2 | 0 | 0 | a200 | (d000* 1 + d100* 1) / 2 |

FIG. 7

| Ya | Ma | Ca | SYMBOL | CALCULATION EQUATION |
|---|---|---|---|---|
| 1 | – | – | – | – |
| 1 | 3 | 3 | a133 | (d000* 3 + d001* 9 + d010* 9 + d011*27 + d100* 1 + d101* 3 + d110* 3 + d111* 9) / 64 |
| 1 | 3 | 2 | a132 | (d000* 3 + d001* 3 + d010* 9 + d011* 9 + d100* 1 + d101* 1 + d110* 3 + d111* 3) / 32 |
| 1 | 3 | 1 | a131 | (d000* 9 + d001* 3 + d010*27 + d011* 9 + d100* 3 + d101* 1 + d110* 9 + d111* 3) / 64 |
| 1 | 3 | 0 | a130 | (d000* 3 + d010* 9 + d100* 1 + d110* 3) / 16 |
| 1 | 2 | 3 | a123 | (d000* 3 + d001* 9 + d010* 3 + d011* 9 + d100* 1 + d101* 3 + d110* 1 + d111* 3) / 32 |
| 1 | 2 | 2 | a122 | (d000* 3 + d001* 3 + d010* 3 + d011* 3 + d100* 1 + d101* 1 + d110* 1 + d111* 1) / 16 |
| 1 | 2 | 1 | a121 | (d000* 9 + d001* 3 + d010* 9 + d011* 3 + d100* 3 + d101* 1 + d110* 3 + d111* 1) / 32 |
| 1 | 2 | 0 | a120 | (d000* 3 + d010* 3 + d100* 1 + d110* 1) / 8 |
| 1 | 1 | 3 | a113 | (d000* 9 + d001*27 + d010* 3 + d011* 9 + d100* 3 + d101* 9 + d110* 1 + d111* 3) / 64 |
| 1 | 1 | 2 | a112 | (d000* 9 + d001* 9 + d010* 3 + d011* 3 + d100* 3 + d101* 3 + d110* 1 + d111* 1) / 32 |
| 1 | 1 | 1 | a111 | (d000*27 + d001* 9 + d010* 9 + d011* 3 + d100* 9 + d101* 3 + d110* 3 + d111* 1) / 64 |
| 1 | 1 | 0 | a110 | (d000* 9 + d010* 3 + d100* 3 + d110* 1) / 16 |
| 1 | 0 | 3 | a103 | (d000* 3 + d001* 9 + d100* 1 + d101* 3) / 16 |
| 1 | 0 | 2 | a102 | (d000* 3 + d001* 3 + d100* 1 + d101* 1) / 8 |
| 1 | 0 | 1 | a101 | (d000* 9 + d001* 3 + d100* 3 + d101* 1) / 16 |
| 1 | 0 | 0 | a100 | (d000* 3 + d100* 1) / 4 |

FIG. 8

| Ya | Ma | Ca | SYMBOL | CALCULATION EQUATION |
|---|---|---|---|---|
| 0 | 3 | 3 | a033 | (d000* 1 + d001* 3 + d010* 3 + d011* 9) / 16 |
| 0 | 3 | 2 | a032 | (d000* 1 + d001* 1 + d010* 3 + d011* 3) / 8 |
| 0 | 3 | 1 | a031 | (d000* 3 + d001* 1 + d010* 9 + d011* 3) / 16 |
| 0 | 3 | 0 | a030 | (d000* 1 + d010* 3) / 4 |
| 0 | 2 | 3 | a023 | (d000* 1 + d001* 3 + d010* 1 + d011* 3) / 8 |
| 0 | 2 | 2 | a022 | (d000* 1 + d001* 1 + d010* 1 + d011* 1) / 4 |
| 0 | 2 | 1 | a021 | (d000* 3 + d001* 1 + d010* 3 + d011* 1) / 8 |
| 0 | 2 | 0 | a020 | (d000* 1 + d010* 1) / 2 |
| 0 | 1 | 3 | a013 | (d000* 3 + d001* 9 + d010* 1 + d011* 3) / 16 |
| 0 | 1 | 2 | a012 | (d000* 3 + d001* 3 + d010* 1 + d011* 1) / 8 |
| 0 | 1 | 1 | a011 | (d000* 9 + d001* 3 + d010* 3 + d011* 1) / 16 |
| 0 | 1 | 0 | a010 | (d000* 3 + d010* 1) / 4 |
| 0 | 0 | 3 | a003 | (d000* 1 + d001* 3) / 4 |
| 0 | 0 | 2 | a002 | (d000* 1 + d001* 1) / 2 |
| 0 | 0 | 1 | a001 | (d000* 3 + d001* 1) / 4 |
| 0 | 0 | 0 | a000 | d000 | ns a

COLOR CORRECTION DEVICE HAVING SEPARATE TABLES FOR BLACK AND COLOR IMAGE DATA

BACKGROUND OF THE INVENTION

The present invention relates to a color correction device for improving color reproducibility of a color image in digital color copiers, color facsimile machines, color scanners, color printers, and the like.

A color correction process is performed in conventional digital color copiers, color facsimile machines, color scanners, color printers and the like. The purpose is to improve color reproducibility of a recorded color image, and this is a process required to prevent turbidity in spectral characteristics of printed ink and deterioration of color purity caused by non-linear distortion during color mixing in color printing. It is known that a color scanner or the like uses first-order masking while a color printer or the like uses second-order or third order masking which is masking of a higher order for correcting non-linear distortion in color reproduction. A masking coefficient used for masking can be obtained using the least square method. The method disclosed in Japanese unexamined patent publication (KOKAI) No. S60-220660 is known wherein an area to be subjected to color reproduction is divided into a plurality of areas, and a plurality of masking coefficients are prepared for respective areas. In the case of masking of higher orders wherein an enormous amount of calculation is required, a look-up table (LUT) method is known which is suitable for real-time processing.

However, conventional methods have had a problem in that color differences can not be reduced when an entire area to be subjected to color reproduction is corrected using a single masking coefficient. Further, in the case of the method wherein an area to be subjected to color reproduction is divided into a plurality of areas and a plurality of masking coefficients are prepared for respective areas, there has been a problem in that distortion of correction occurs at boundaries between such areas. Masking of higher orders has had a problem in that an enormous amount of calculation is required. The look-up table method suitable for real-time processing also has had a problem in that a table of a large capacity is required and in that sufficient interpolation accuracy can not be achieved.

SUMMARY OF THE INVENTION

It is therefore an object of the present invention to provide a color correction device which minimizes color differences throughout an area to be subjected to color reproduction in order to solve the problems as described above in the prior art.

In order to solve the above-described problems, according to the present invention, in a color correction device to which color image data consisting of cyan, magenta, yellow, and black are input and which outputs color image data of cyan, magenta, yellow, and black which have been subjected to color correction by a color correction means or the like, color reproduction is optimized by providing a dynamic range conversion means which converts the dynamic ranges of cyan, magenta, and yellow, a separation means to which said converted data is input and which separates it into high order bits and low order bits, a CMY reference means which obtains CMY table values corresponding to said high order bits from CMY tables, and an interpolation means which performs an interpolation process based on the low order bits separated by said separation means and the CMY table values obtained by said CMY table reference means, a K-table reference means which obtains four K-table values corresponding to the black from K-tables, and a CMY correction means which corrects the values of cyan, magenta, and yellow based on three data interpolated by said interpolation means and three data obtained by said K-table reference means.

In a color correction device having the above-described configuration, CMY tables for color correction on cyan, magenta, and yellow are stored in the CMY table reference means, and K-tables for color correction on black are stored in the K-table reference means. When image data of cyan, magenta, yellow, and black are input, the dynamic range conversion means converts the dynamic ranges of the input cyan, magenta, and yellow; the separation means separates said converted data into high order bits and low order bits; the CMY table reference means obtains CMY table values corresponding to the high order bits from the CMY tables; and the interpolation means performs an interpolation process based on the low order bits separated by said separation means and the CMY table values obtained by said CMY table reference means. Further, the K-table reference means obtains four K-table values corresponding to the input black from the K-tables. In addition, the CMY correction table corrects the values of cyan, magenta, and yellow based on three data interpolated by said interpolation means and three data obtained by said K-table reference means to output color image data of cyan, magenta, yellow, and black which have been subjected to color correction.

BRIEF DESCRIPTION OF THE DRAWINGS

FIG. 1 illustrates a color correction device according to the present invention.

FIG. 5 illustrates an embodiment of a process in an interpolation means of a color correction device according to the present invention.

FIG. 6 illustrates an embodiment of a process in an interpolation means of a color correction device according to the present invention.

FIG. 7 illustrates an embodiment of a process in an interpolation means of a color correction device according to the present invention.

FIG. 8 illustrates an embodiment of a process in an interpolation means of a color correction device according to the present invention.

DESCRIPTION OF THE PREFERRED EMBODIMENTS

An embodiment of the present invention will now be described with reference to the drawings.

FIG. 1 is a block diagram illustrating a configuration of a color correction device according to the present invention.

Figure 2:
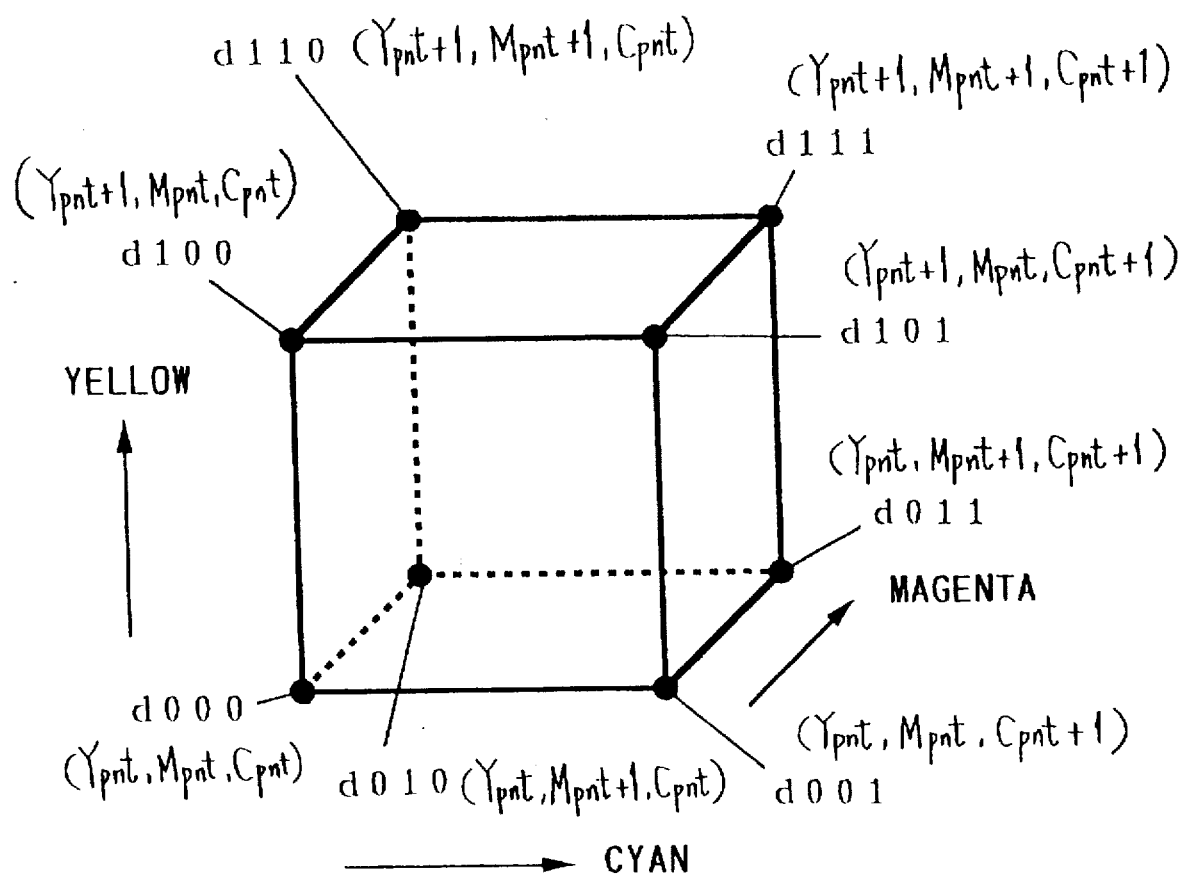
FIG. 2 is a conceptual view illustrating a CMY table reference means of a color correction device according to the present invention.
Figure 3:
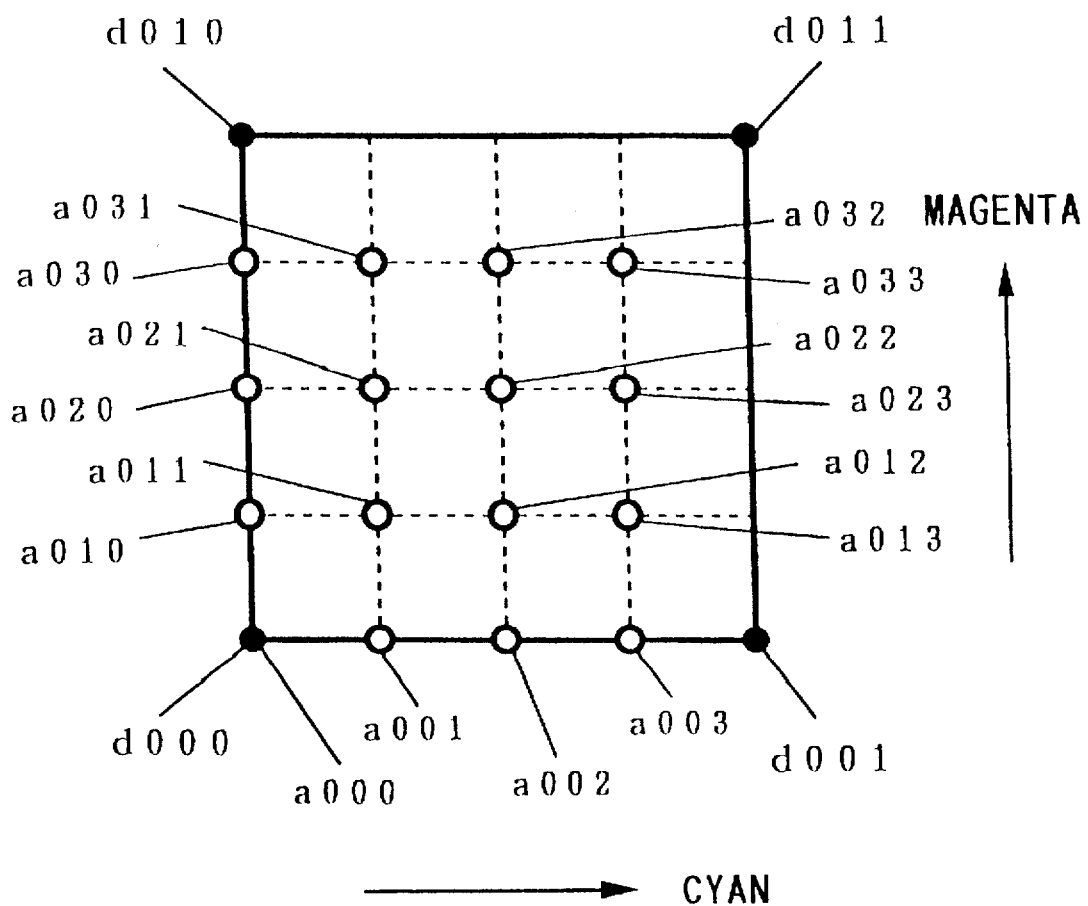
FIG. 3 is a conceptual view illustrating an interpolation means of a color correction device according to the present invention.

FIG. 2 is a conceptual view illustrating a part of a CMY table which is referred to by a CMY table reference means according to the present invention. FIG. 3 is a view showing the concept of an interpolation means according to the present invention in the form of a plan view wherein yellow has an arbitrary value.

Here, input color data is represented by Cin (cyan), Min (magenta), Yin (yellow), and Kin (black), and output image data after color correction is represented by Cout (cyan), Mout (magenta), Yout (yellow), and Kout (black). Each of the input color image data is constituted by 8 bits and has a value in the range from 0 to 255. Each of the output color image data is also constituted by 8 bits and has a value in the range from 0 to 255. As described later, the CMY table referred to by the CMY table reference means includes an LUT of $41^3$ bytes for each of cyan, magenta, and yellow, and the K-table referred to by the K-table reference means is a table of 256×4 bytes. For clarity, it is assumed in the following description that the interpolation means performs linear interpolation using three interior division points as shown in FIG. 3 and that the CMY correction means performs a compression process based on proportional distribution at the time of overflow.

Referring to FIG. 1, CMY tables for color correction on cyan, magenta, and yellow are stored in a CMY table reference means 3 in advance, and K-tables for color correction on black are stored in a K-table reference means 5 in advance. When input color image data (Cin, Min, Yin, and Kin) each constituted by 8 bits are input, a dynamic range conversion means 1 converts the dynamic ranges of the input image data Cin, Min, and Yin using dynamic range conversion means 1a, 1b, and 1c, respectively.

According to the dynamic range conversion of the present embodiment, 8-bit input color image data represented by a value in the range from 0 to 255 is converted into 8-bit color image data represented by a value in the range from 0 to 160. The reason for the conversion of the data into a value in 161 steps from 0 to 160 is as follows.

It is desired that a CMY table referred to by the CMY table reference means 3 has a capacity which is as small as possible and is free from any problem in actual use for reasons including the cost involved in the fabrication of the color correction device and size and accuracy of the same. Taking such a condition into consideration, the CMY tables are configured so that cyan, magenta, and yellow data each having a value in the range from 0 to 40 are input and so that they provide output data of 8 bits. Such a table is provided for each of cyan, magenta, and yellow to output cyan data, magenta data, and yellow data, respectively. As apparent from the above description, one table is an LUT having a capacity of $41^3$ bytes. Since the interpolation process performed by an interpolation means 4 in the present embodiment uses three interior division points as shown in FIG. 3, the dynamic range conversion means converts input color image data having a value in 256 steps from 0 to 255 into data in 161 steps [41+(40×3)] from 0 to 160 so that three interior division points are included in 41 steps.

This dynamic range conversion may be either linear conversion or non-linear conversion, and the type of conversion employed is determined by the desired specifications. As for the specific configuration of the dynamic range conversion means, a look-up table may be used or actual calculation for conversion may be performed on a software or hardware basis. In the present embodiment, the dynamic range conversion is linear conversion, and the following calculation is carried out on a software basis for the data of each color.

(converted data)=(data before conversion)×160/255

Each of the color image data of cyan, magenta, and yellow which have been subjected to the dynamic range conversion is separated by a separation means 2 into high order six bits which is a value in 41 steps from 0 to 40 and low order two bits which is a value in four steps from 0 to 3. The high order bits are transferred to the CMY table reference means 3 while the low order bits are transferred to the interpolation means 4. The CMY table reference means 3 refers to an independent CMY table for each of cyan, magenta, and yellow based on the data of cyan, magenta, and yellow separated into a value in 41 steps from 0 to 40 to obtain three sets of eight lattice point data d000, d001, d010, d011, d100, d101, d110, and d111 for cyan, magenta, and yellow.

A more specific description will be made with reference to FIG. 2. Let us assume that Cpnt, Mpnt, and Ypnt respectively represent the values of the data of cyan, magenta, and yellow separated by the separation means 2. Then, eight lattice point data are obtained which are specifically data d000 of a coordinate (Ypnt, Mpnt, Cpnt), data d001 of a coordinate (Ypnt, Mpnt, Cpnt+1), data d010 of a coordinate (Ypnt, Mpnt+1, Cpnt), data d011 of a coordinate (Ypnt, Mpnt+1, Cpnt+1), data d100 of a coordinate (Ypnt+1, Mpnt, Cpnt), data d101 of a coordinate (Ypnt+1, Mpnt, Cpnt+1), data d110 of a coordinate (Ypnt+1, Mpnt+1, Cpnt), and data d111 of a coordinate (Ypnt+1, Mpnt+1, Cpnt+1). The interpolation means performs interpolation processes on cyan, magenta, and yellow independently of each other based on the three sets of eight lattice point data obtained by the CMY table reference means 3 and three sets of data having a value in three steps from 0 to 3 separated by the separation means 2 and outputs cyan data dc, magenta data dm, and yellow data dy.

The above-described interpolation process will be more specifically described with reference to FIG. 3 and FIGS. 5 though 8. Let us assumed that Ca, Ma, and Ya respectively represent the values of the low order bits of cyan, magenta, and yellow separated by the separation means 2 and a set of eight lattice point data obtained by the CMY table reference means 3 are represented by d000, d001, d010, d011, d100, d101, d010, and d111. Then, the calculations as shown in FIGS. 5 through 8 are carried out based on the values Ca, Ma, and Ya using the set of eight lattice point data d000, d001, d010, d011, d100, d101, d110, and d111 to obtain interpolation data. An interpolation process on each color data is then performed by the interpolation means 4 to obtain the interpolated data dc, dm, and dy of cyan, magenta, and yellow, respectively. Although the present embodiment employs linear interpolation with a sufficient results, it goes without saying that non-linear interpolation may be employed.

Kin among the input color image data is input to the K-table reference means 5 which then refers to independent K-tables for cyan, magenta, yellow, and black and outputs four 8-bit data, i.e., cyan data kc, magenta data km, yellow data ky, and black data Kout. The contents of each of the independent K-tables for cyan, magenta, yellow, and black is empirically determined. For example, a reproduction image output by a recording device which generates an reproduction image from the data (Cin, Min, Yin, Kin) of an original image is compared with the original image, and the data on the K-tables are determined to minimize the difference therebetween.

A CMY correction means 6 performs a correction process using the cyan data dc, magenta data dm, yellow data dy calculated by the interpolation means 4 and the cyan data kc, magenta data km, yellow data ky output by the K-table reference means 5 to calculate cyan data Cout, magenta data Mout, and yellow data Yout.

A more specific description will be made with reference to FIG. 4 wherein the cyan data, magenta data, and yellow data calculated by the interpolation means 4 are represented by dc, dm, and dy, respectively, and the cyan data, magenta data, and yellow data output by the K-table reference means 5 are represented by kc, km, and ky, respectively (S5a); next, the data dc, dm, dy output by the interpolation means 4 are respectively added to the data kc, km, and ky output by the K-table reference means 5 for each of the cyan, magenta, and yellow data (S5b); if cyan data cc, magenta data mm, and yellow data yy obtained by the addition are all less than 256, the cyan data cc, magenta data mm, and yellow data yy as a result of the addition become the output data Cout, Mout, and Yout (S5c, S5d). If any one of the cyan data cc, magenta data mm, and yellow data yy as a result of the addition is equal to or greater than 256, a maximum value maxCMY is obtained from the cyan data cc, magenta data mm, and yellow data yy (S5c, S5e), and a compression process is performed based on the obtained maximum value maxCMY and the cyan data cc, magenta data mm, and yellow data yy to calculate the output data Cout, Mout, and Yout (S5f).

Figure 4:
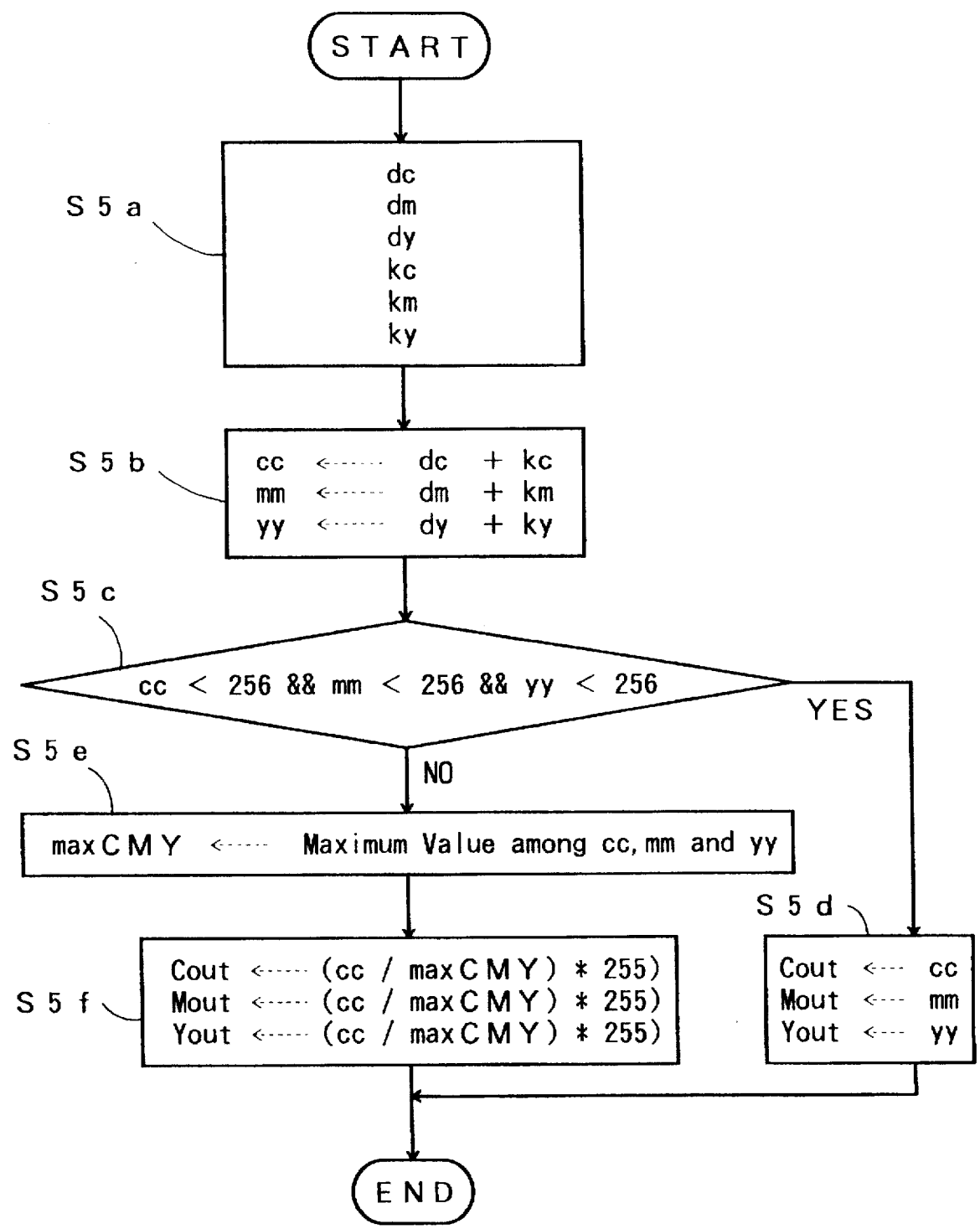
FIG. 4 illustrates the flow of a process in a CMY correction means of a color correction device according to the present invention.

Although the compression process in the present embodiment is on a linear basis as shown in FIG. 4, the present invention is not limited thereto. The process as described above provides output color image data (Cout, Mout, Yout, Kout) which have been subjected to color correction.

According to the present embodiment, the cyan data cc, magenta data mm, and yellow data yy are obtained by adding the data dc, dm, and dy output by the interpolation means 4 and the data kc, km, and ky output by the K-table reference means 5, respectively, for each of the cyan, magenta, and yellow data. However, the addition may be carried out after multiplying the data by some coefficient, or a non-linear process can be performed.

In addition, although the CMY correction means 6 may be configured on a software basis as in the present embodiment, it may alternatively be configured on a hardware basis.

As described above, the present invention employs a configuration constituted by a dynamic range conversion means 1 for cyan, magenta, and yellow, a separation means 2 for separating them into high order bits and low order bits, a CMY table reference means 3 for obtaining CMY table values corresponding to the high order bits, an interpolation means 4 for performing an interpolation process based on the low order bits and the CMY table values, a K-table reference means 5 for obtaining four K-table values corresponding to black, and a CMY correction means 6 for correcting the values of cyan, magenta, and yellow based on three interpolated data and three data obtained by the K-table reference means. As a result, there in an advantage in that a color difference between an original image and a reproduction image can be reduced.

Further, the above-described configuration wherein separate tables are configured for black image data and image data of other colors provides an advantage in that the capacity of each table can be small.

What is claimed is:

1. A color correction device to which color image data of cyan, magenta, yellow, and black are input and which outputs color image data of cyan, magenta, yellow, and black which have been subjected to color correction, comprising:

a dynamic range conversion means for converting a dynamic range of each of the cyan, magenta, yellow, and black input color image data;

a separation means for separating the data converted by said conversion means into high order bits and low order bits;

a CMY table reference means having CMY tables to which said high order bits of said cyan, magenta, and yellow output by said separation means are input for outputting the data related to each of cyan, magenta, and yellow in accordance with the input to said CMY tables;

an interpolation means for performing an interpolation process based on said low order bits of said cyan, magenta, and yellow output by said separation means and said data related to each of cyan, magenta, and yellow output by said CMY table reference means and for outputting interpolation data dc, dm, and dy related to cyan, magenta, and yellow, respectively;

a K-table reference means having K-tables to which said black color image data is input for outputting data kc, km, ky, and Kout related to cyan, magenta, yellow, and black, respectively in accordance with said black color data; and a CMY correction means for outputting cyan, magenta, and yellow color data which have been subjected to color correction using the three interpolation data dc, dm, and dy interpolated by said interpolation means and the three data kc, km, and ky output by said K-table reference means.

2. The color correction device according to claim 1, wherein said Kout data is used as black image data after color correction.

3. The color correction device according to claim 1, wherein said CMY correction means includes an addition means for adding said interpolation data dc, dm, and dy and said data kc, km, and ky, respectively, and a determination means for determining the results of said addition as color-corrected cyan, magenta, and yellow image data, respectively, when all of the results of addition are less than predetermined values.

4. The color correction device according to claim 3, wherein said CMY correction means further includes a compression means for compressing said respective results of addition when at least one of said results of addition is equal to or greater than said predetermined value.

5. The color correction device according to claim 4, wherein said compression means performs a compression process based on linear proportional distribution.

* * * * *